US010601188B2

(12) United States Patent
Ireland et al.

(10) Patent No.: US 10,601,188 B2
(45) Date of Patent: Mar. 24, 2020

(54) JUMPER HARNESS WITH LED

(71) Applicant: CNH Industrial America LLC, New Holland, PA (US)

(72) Inventors: Scott Gregory Ireland, Washburn, IL (US); Yong Deng, Peoria, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/052,179

(22) Filed: Aug. 1, 2018

(65) Prior Publication Data

US 2020/0044398 A1 Feb. 6, 2020

(51) Int. Cl.
*H01R 13/717* (2006.01)
*F21V 23/00* (2015.01)
*F21V 23/02* (2006.01)
*B60R 16/02* (2006.01)
*A01M 7/00* (2006.01)
*A01B 76/00* (2006.01)
*F21W 107/10* (2018.01)
*F21Y 115/10* (2016.01)

(52) U.S. Cl.
CPC ......... *H01R 13/7175* (2013.01); *A01B 76/00* (2013.01); *A01M 7/0089* (2013.01); *B60R 16/0207* (2013.01); *F21V 23/001* (2013.01); *F21V 23/02* (2013.01); *F21W 2107/10* (2018.01); *F21Y 2115/10* (2016.08)

(58) Field of Classification Search
CPC .. H05B 33/08; B60R 16/0207; A01M 7/0089; H01R 13/7175
USPC ........................................................ 439/490
See application file for complete search history.

(56) References Cited

U.S. PATENT DOCUMENTS

| 4,690,475 | A | * | 9/1987 | McElroy | ............. | G01R 31/021 |
| | | | | | | 439/502 |
| 4,852,657 | A | | 8/1989 | Hardy et al. | | |
| 4,957,016 | A | | 9/1990 | Amedei et al. | | |
| 4,969,834 | A | * | 11/1990 | Johnson | ............ | H01R 13/6691 |
| | | | | | | 320/105 |
| 4,999,574 | A | * | 3/1991 | Stephens | .......... | G01R 19/16557 |
| | | | | | | 324/133 |
| 5,170,730 | A | | 12/1992 | Swallow | | |
| 5,172,062 | A | * | 12/1992 | Eisermann | ........... | G01R 31/007 |
| | | | | | | 324/503 |
| 5,184,960 | A | * | 2/1993 | Hopkins | ................. | B60D 1/62 |
| | | | | | | 280/422 |
| 5,270,638 | A | * | 12/1993 | Mellott | ................. | G01R 19/14 |
| | | | | | | 324/133 |

(Continued)

FOREIGN PATENT DOCUMENTS

CN        102029989 A        4/2011

*Primary Examiner* — Tulsidas C Patel
*Assistant Examiner* — Peter G Leigh
(74) *Attorney, Agent, or Firm* — Rebecca L. Henkel; Rickard K. DeMille

(57) ABSTRACT

A jumper harness for a work vehicle or agricultural implement is provided. The jumper harness includes multiple electrical conductors, a first connector, and a second connector. The first and second connectors are configured to couple the jumper harness to a wiring harness of an electrical circuit of the work vehicle or the agricultural implement. The jumper harness also includes a light emitting diode (LED) coupled to the electrical conductors, wherein the LED is configured to emit light when receiving electric power.

19 Claims, 3 Drawing Sheets

(56) References Cited

U.S. PATENT DOCUMENTS

| | | | | |
|---|---|---|---|---|
| 5,442,332 | A * | 8/1995 | Hughes | B60Q 1/305 200/61.45 R |
| 5,532,927 | A * | 7/1996 | Pink | G01R 31/007 701/29.7 |
| 5,635,843 | A * | 6/1997 | Borland | G01R 31/006 324/133 |
| 5,666,453 | A * | 9/1997 | Dannenmann | G02B 6/3895 385/100 |
| 5,686,840 | A * | 11/1997 | Johnson | G01D 18/00 324/542 |
| 5,766,020 | A * | 6/1998 | Hughes | B60D 1/64 439/35 |
| 5,833,493 | A * | 11/1998 | Hung | H01R 11/00 439/504 |
| 5,936,407 | A * | 8/1999 | Borland | G01R 31/006 324/504 |
| 6,114,952 | A | 9/2000 | Francesangeli et al. | |
| 6,218,952 | B1 * | 4/2001 | Borland | B60Q 1/305 340/641 |
| 6,354,081 | B1 * | 3/2002 | Burton | A01B 63/10 15/82 |
| 6,535,113 | B1 * | 3/2003 | Gravolin | B60Q 11/007 307/10.8 |
| 6,709,275 | B1 * | 3/2004 | Ihde | H01R 29/00 439/189 |
| 7,225,065 | B1 * | 5/2007 | Hunt | B60R 16/0207 701/33.2 |
| 7,826,930 | B2 | 11/2010 | Giles et al. | |
| 7,859,420 | B2 * | 12/2010 | Hamilton | G01R 15/12 324/556 |
| 7,881,887 | B2 * | 2/2011 | Kinahan | G01R 31/021 174/113 R |
| 8,080,905 | B2 | 12/2011 | Straka | |
| 8,191,795 | B2 * | 6/2012 | Grimm | A01M 7/0089 239/1 |
| 8,276,996 | B2 | 10/2012 | Lesesky et al. | |
| 8,344,737 | B2 * | 1/2013 | Watson | G01R 31/3278 324/133 |
| 9,131,674 | B2 * | 9/2015 | Engelbrecht | A01M 7/0089 |
| 9,144,187 | B2 | 9/2015 | Bassett et al. | |
| 9,485,900 | B2 * | 11/2016 | Connell | A01B 76/00 |
| 9,639,996 | B2 * | 5/2017 | Treharne | G01R 31/007 |
| 2002/0189435 | A1 * | 12/2002 | Domann | E02F 3/3609 91/459 |
| 2004/0263178 | A1 * | 12/2004 | Klaus | B60T 13/683 324/504 |
| 2009/0171482 | A1 | 7/2009 | Mindeman | |
| 2009/0292416 | A1 * | 11/2009 | Ubik | H04W 24/00 701/32.8 |
| 2014/0265239 | A1 * | 9/2014 | Foster | G05G 1/105 280/400 |

* cited by examiner

JUMPER HARNESS WITH LED

BACKGROUND

The invention relates generally to a jumper harness for use with agricultural equipment. In particular, the jumper harness includes a light emitting diode (LED).

Work vehicles (e.g., agricultural vehicles such as tractors, combine harvesters, etc.) utilize solenoids and/or valves for a variety of applications (e.g., clutch, braking, etc.). In addition, agricultural implements (e.g., tillage implement, agricultural sprayer, etc.) utilize solenoids and/or valves for a variety of applications (e.g., release of chemicals, movement of components such as a stabilizer wheel or harrow basket, etc.). The work vehicles and/or agricultural implements may include numerous solenoids and/or valves coupled to electrical circuits and/or hydraulic circuits. It may be difficult to determine the source of a problem with a component of a work vehicle and/or agricultural implement that utilizes solenoids and/or valves.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a jumper harness for a work vehicle or agricultural implement is provided. The jumper harness includes multiple electrical conductors, a first connector, and a second connector. The first and second connectors are configured to couple the jumper harness to a wiring harness of an electrical circuit of the work vehicle or the agricultural implement. The jumper harness also includes a light emitting diode (LED) coupled to the electrical conductors, wherein the LED is configured to emit light when receiving electric power.

In another embodiment, an agricultural implement is provided. The agricultural implement includes a wiring harness of an electrical circuit coupled to a solenoid or a valve. The agricultural implement also includes a jumper harness. The jumper harness includes multiple electrical conductors, a first connector, and a second connector. The first and second connectors are configured to couple the jumper harness to the wiring harness. The jumper harness also includes a light emitting diode (LED) coupled to the electrical conductors. The LED is configured to emit light when receiving electric power that is provided to the solenoid or valve.

In a further embodiment, a method for performing diagnostics on a work vehicle or an agricultural implement is provided. The method includes coupling a jumper harness to a wiring harness of an electrical circuit coupled to a solenoid or a valve of the work vehicle or the agricultural implement. The jumper harness includes multiple conductors and a light emitting diode (LED) coupled to the electrical conductors. The method also includes providing electric power to the electrical circuit. The method further includes emitting light when receiving electric power that is provided to the solenoid or the valve. The method even further includes failing to emit light when electric power is not provided to the solenoid or valve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
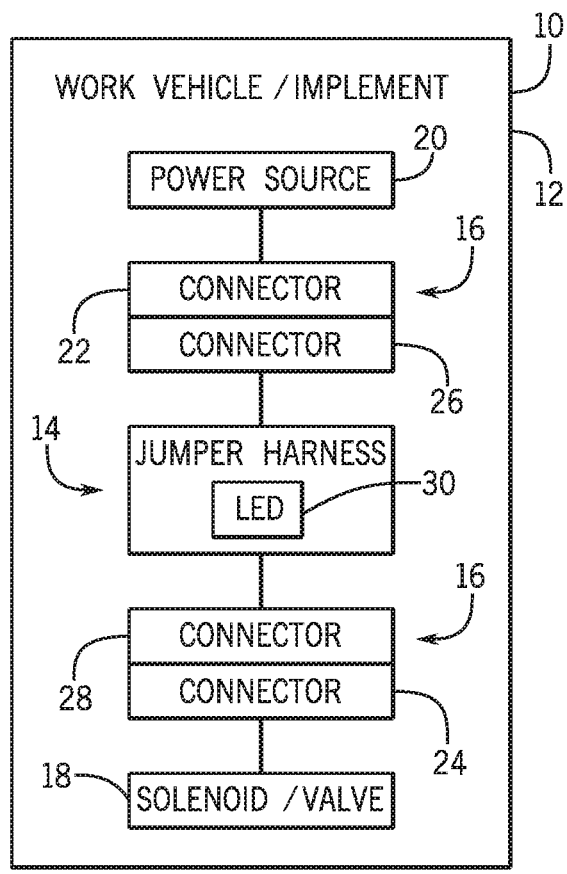
FIG. 1 is a schematic diagram of an embodiment of a work vehicle and/or agricultural implement that includes a jumper harness coupled to a wiring harness of a solenoid or valve.

Turning now to the drawings, FIG. 1 is a schematic diagram of an embodiment of a work vehicle 10 and/or agricultural implement 12 that includes a jumper harness 14 coupled to a wiring harness 16 of a solenoid or valve 18. The wiring harness 16 is coupled to a power source 20 (e.g., DC power source such as a battery) to form an electrical circuit that provides electric power to the solenoid or valve 18. The solenoid or valve 18 may be utilized for a variety of functions on the work vehicle 10 and/or agricultural implement 12 (e.g., associated with hydraulics) as described in greater detail below. The wiring harness 16 includes a connector 22 configured to couple a connector 24 to form the electrical circuit coupled to the solenoid or valve 18. The connector 22 and the connector 24 may be plug and receptacle connectors, respectively. Alternatively, the connector 22 and the connector 24 may be receptacle and plug connectors, respectively. In certain embodiments, different types of connectors from those described may be utilized for the wiring harness 16.

The jumper harness 14 includes one or more electrical conductors coupled to connectors 26, 28. The connectors 26, 28 are configured to couple to the connectors 22, 24, respectively, to removably couple the jumper harness 14 to the wiring harness 16. The type of connector for connectors 26, 28 depends on the type of connector for connectors 22, 24. In certain embodiments, the connectors 26, 28 may be receptacle and plug connectors, respectively. In certain embodiments, the connectors 26, 28 may be plug and receptacle connectors, respectively. In certain embodiments, different types of connectors from those described may be utilized for the jumper harness 14.

In the presence of electric power, the jumper harness 14 is electrically coupled to the wiring harness 16. The jumper harness 14 includes at least one LED 30 coupled to the electrical conductors. In certain embodiments, the jumper harness 14 includes a single LED 30. In certain embodiments, the jumper harness 14 includes multiple LEDs 30 (e.g., 2, 3, 4, or any other number). In the presence of electric power provided to the solenoid or valve 18, the LED 30 emits light. In the absence of electric power provided to the solenoid or valve 18, the LED 30 fails to emit light. The failure of the LED 30 to emit light when electric power should be provided to the solenoid or valve 18 indicates a problem with the electrical circuit coupling the power source 20 to the solenoid or valve 18.

The jumper harness 14 may be temporarily coupled to the wiring harness 16 for diagnostic purposes to determine if an electrical circuit is providing electric power to the solenoid or valve 18. In certain embodiments, the jumper harness 14 may be coupled to the wiring harness 16 during agricultural operations for monitoring proper operation of various components (electrical circuits, hydraulic circuits, etc.). In certain embodiments, the jumper harness 14 harness may be utilized with an electrical circuit of a wiring harness not associated with a solenoid or valve.

In certain embodiments, in the presence of electric power, the LED 30 may constantly emit light. In certain embodiments, in the presence of electric power, the LED 30 may flash. The flash rate of the LED 30 can be modified to be slower or faster based on the type of LED and the resistor utilized. The color of light emitted by the LED 30 may vary. For example, the LED 30 may emit light as red, blue, or another color. The intensity of the light emitted by the LED 30 may also vary depending on the type of LED and the resistor utilized. The size of the LED 30 may vary (e.g., 2 mm, 5 mm, etc.).

In certain embodiments, the jumper harness 14 is designed for a 12 volt operating system. In certain embodiments, the jumper harness 14 can be configured for an operating system with a different voltage by altering the type of LED (e.g., size) and resistor (e.g., resistance) utilized. For example, a larger LED and a resistor with a higher resistance would enable the jumper harness 14 to be utilized with an operating system operating at a higher voltage (e.g., greater than 12 volt). Alternatively, a LED and a resistor may be utilized in the jumper harness 14 enabling use with a lower voltage (e.g., less than 12 volt) operating system.

Figure 2:
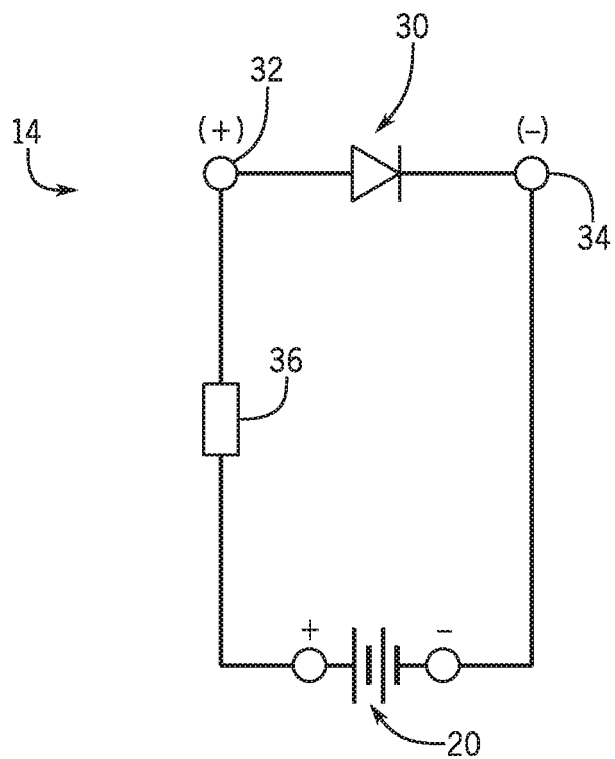
FIG. 2 is a schematic electrical diagram of an embodiment of a jumper harness having an LED.

FIG. 2 is a schematic electrical diagram of an embodiment of the jumper harness 14 having the LED 30. As depicted, an anode 32 and a cathode 34 are coupled to the LED 30. A resistor 36 is coupled to the anode side of the LED 30. In certain embodiments, the resistance of the resistor 36 may range from 1 ohm to 1,200 ohm. In particular, the resistance of the resistor 36 may range between 102 and 150 Ohms. In embodiments, where the jumper harness 14 includes multiple LEDS, each LED is coupled to a respective resistor.

Figure 3:
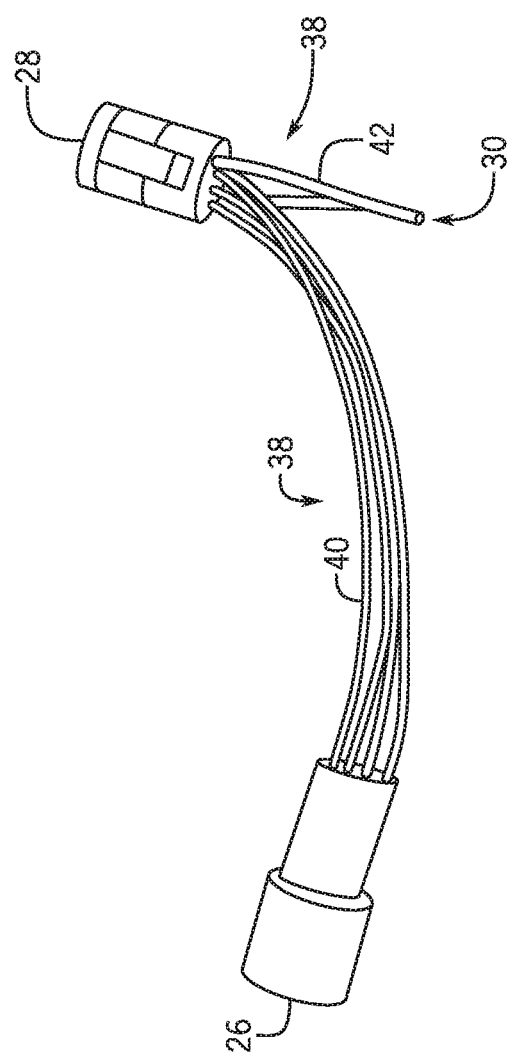
FIG. 3 is a perspective view of an embodiment of a jumper harness having an LED.

FIG. 3 is a perspective view of an embodiment of the jumper harness 14 having the LED 30. As depicted, the jumper harness 14 includes the connector 26 (e.g., 2 way receptacle connector) and the connector 28 (2 way plug connector) coupled via electrical conductors 38. The depicted jumper harness 14 may be utilized with any pin or socket type connector that has enough clearance for the wires coupled to the LED 30 to pass into the back body of the specific connector. In certain embodiments, the electrical conductors 38 may include a 2 wire (e.g., red and black) connection consisting of 18 American wire gauge (AWG) wire that forms the main wire connection 40 between the connectors 26, 28. In certain embodiments, secondary wiring 42 for the LED 30 consists of 20 AWG wire. For example, 20 AWG wire having the resistor 36 may be coupled to the anode or positive side of the LED 30, while 20 AWG wire may be coupled to the cathode or negative side of the LED 30. In certain embodiments, the wires coupled to the LED 30 may be covered in heat shrink tubing to indicate the positive and negative wiring. The connection of the secondary wiring 42 of the LED 30 may be coupled to either the pin or socket side of the connector 28. For example, the positive and negative wires of the secondary wiring 42 may be twisted together and inserted into the contact pin or socket and then crimped. After crimping, the contacts are assembled in the appropriate housing following typical assembly protocols. A similar process may be followed for any other type of connector. The secondary wiring 42 of the LED 30 is electrically coupled to the main wire connection 40 via the connector 28.

Figure 4:
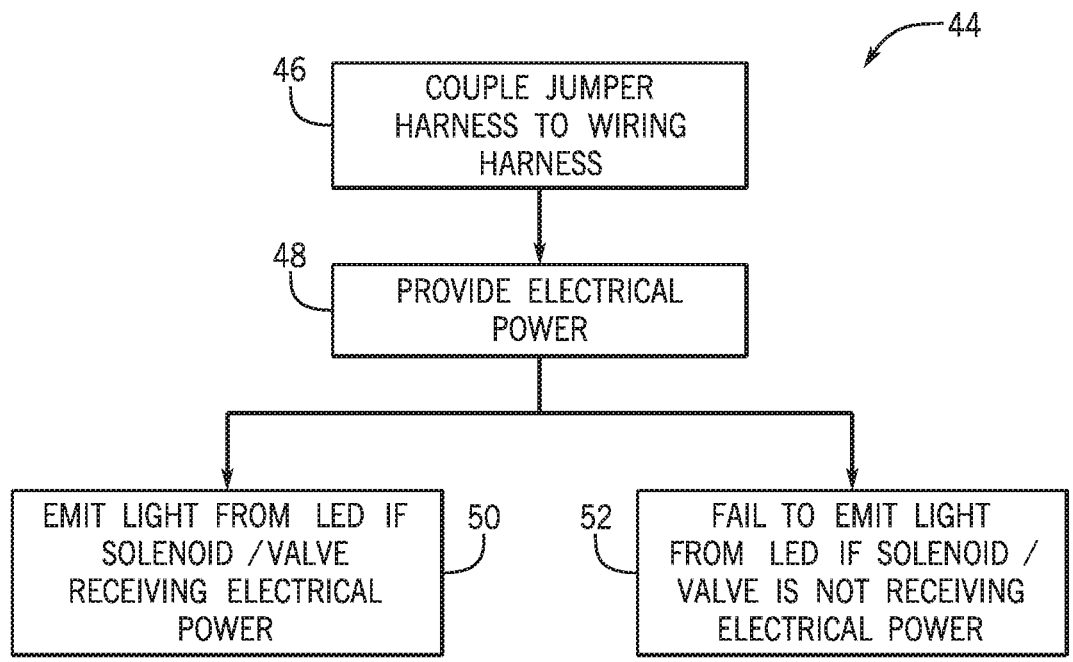
FIG. 4 is a flow chart of an embodiment of a method for performing diagnostics on a work vehicle or agricultural implement.

FIG. 4 is a flow chart of an embodiment of a method 44 for performing diagnostics on a work vehicle 10 or agricultural implement 12. The method 44 includes coupling the jumper harness 14 having the LED 30 to the wiring harness 16 (block 46). For example, the connectors 26, 28 of the jumper harness 14 may be coupled to the connectors 22, 24 of the wiring harness 16 to couple the jumper harness 14 in line with the wiring harness 16. In certain embodiments, the wiring harness 16 is coupled to an electrical circuit associated with a hydraulic circuit or simply an electrical circuit. For example, the wiring harness 16 may be coupled to and provide electric power to (via the power source 20) the solenoid or valve 18. The method 44 also includes providing electric power (via the power source 20 coupled to the wiring harness 16) to the wiring harness 16 (and, in certain embodiments, the solenoid or valve 18) (block 48). In certain embodiments, electric power is constantly applied to the wiring harness 16 and the downstream destination during operation. In certain embodiments, electric power is provided (e.g., intermittently) to the wiring harness 16 and the downstream destination only when the downstream destination is specifically being utilized. If electric power is provided to the wiring harness 16 and subsequently to the downstream destination (e.g., the solenoid or valve 18), the method 44 includes emitting light from the LED 30 of the jumper harness 14 (block 50). If electric power is provided to the wiring harness 16 but the downstream destination does receive electric power, the LED 30 of the jumper harness 14 fails to emit light (block 52). Failure to emit light may be due to an issue with the circuitry of the wiring harness 16 or some other issue.

Figure 5:
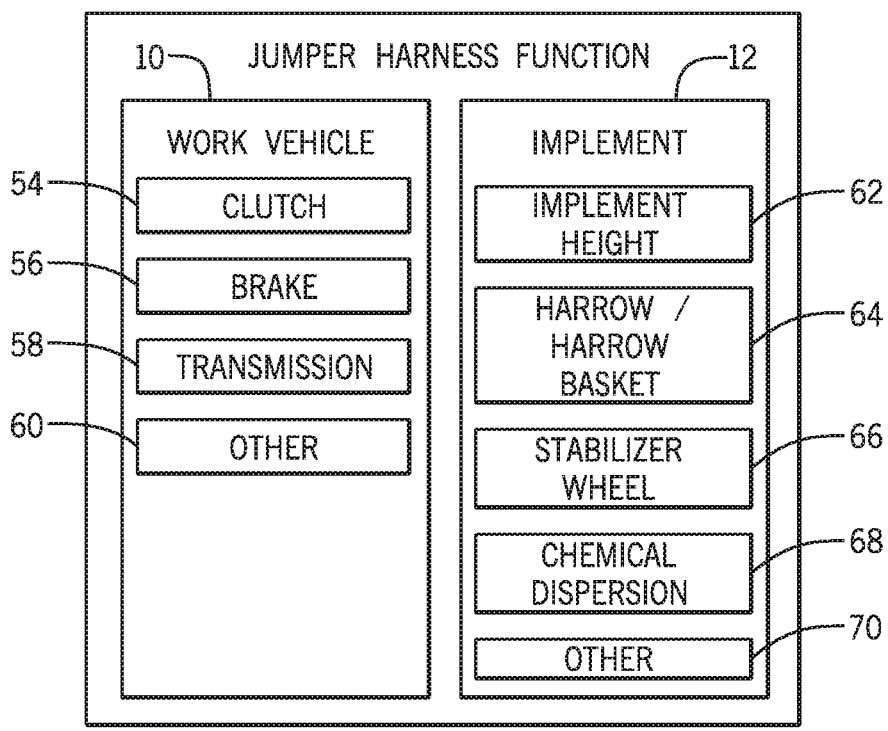
FIG. 5 is a schematic diagram of an embodiment of various functions for jumper harness utilization.

FIG. 5 is a schematic diagram of an embodiment of various functions for jumper harness utilization. As mentioned above, the jumper harness 14 may be utilized on any work vehicle 10 (e.g., agricultural vehicle such as a tractor, combine harvester, etc.) that utilizes electrical and/or hydraulic circuits for certain functions. In addition, the jumper harness 14 may be utilized on any agricultural implements 12 (tillage implement, sprayer boom, etc.) that utilize electrical and/or hydraulic circuits for certain functions. Specifically, for the work vehicle 10, the jumper harness 14 may be utilized for monitoring the function of the clutch 54, brake 56, transmission 58, or any other function 60 that utilizes an electrical and/or hydraulic circuit where the LED 30 of the jumper harness 14 would be visible to the operator. For the agricultural implement 12, the jumper harness 14 may be utilized for monitoring the function of adjusting implement height 62, adjusting a harrow or harrow basket 64, adjusting a stabilizer wheel 66, dispersing chemicals 68 via sprayer boom, or any other function 70 that utilizes an electrical and/or hydraulic circuit. As noted above, the jumper harness 14 may be utilized for diagnostic purposes (e.g., repair diagnostics when a system is not working during machine set up) or during field operation of the equipment to monitor the proper operation of the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A jumper harness for a work vehicle or agricultural implement, comprising:
    a plurality of electrical conductors;
    a first connector;
    a second connector, wherein the first and second connectors are configured to couple the jumper harness to a wiring harness of an electrical circuit of the work vehicle or the agricultural implement; and
    a light emitting diode (LED) coupled to the electrical conductors, wherein the LED is configured to emit light when receiving electric power;
    wherein an entirety of the jumper harness is disposed on the agricultural implement when coupled to the wiring harness on the agricultural implement, wherein the wiring harness is coupled to a solenoid or a valve, and the LED is configured to emit light when the solenoid or the valve is receiving the electric power.

2. The jumper harness of claim 1, wherein the LED is configured to continuously emit light when receiving electric power.

3. The jumper harness of claim 1, wherein the LED is configured to flash on and off when receiving electric power.

4. The jumper harness of claim 1, wherein the agricultural implement comprises a tillage implement, and wherein the solenoid or the valve is located on a hydraulic basket of the tillage implement.

5. The jumper harness of claim 1, wherein the agricultural implement comprises an agricultural sprayer, and wherein the solenoid or the valve is located on the agricultural sprayer.

6. The jumper harness of claim 1, wherein the jumper harness is configured to be utilized during field operations of the work vehicle or the agricultural implement.

7. The jumper harness of claim 1, wherein the jumper harness is configured to be utilized during performance of diagnostics on the work vehicle or agricultural implement.

8. The jumper harness of claim 1, wherein the jumper harness is configured for utilization with a 12 volt operating system.

9. The jumper harness of claim 1, wherein the jumper harness comprises a plurality of the LEDs.

10. An agricultural implement, comprising:
    a wiring harness of an electrical circuit coupled to a solenoid or a valve, wherein the wiring harness comprises a first connector and a second connector;
    a jumper harness, comprising:
        a plurality of electrical conductors;
        a third connector;
        a fourth connector, wherein the third and fourth connectors are configured to couple the jumper harness to the wiring harness by coupling the third connector to the first connector and the fourth connector to the second connector, wherein the entirety of the wiring harness and the jumping harness are disposed on the agricultural implement when coupled together; and
        a light emitting diode (LED) coupled to the electrical conductors, wherein the LED is configured to emit light when receiving electric power that is provided to the solenoid or the valve.

11. The agricultural implement of claim 10, wherein the LED is configured to continuously emit light when receiving electric power.

12. The agricultural implement of claim 10, wherein the LED is configured to flash on and off when receiving electric power.

13. The agricultural implement of claim 10, wherein the agricultural implement comprises a tillage implement, and wherein the solenoid or the valve is located on a hydraulic basket of the tillage implement.

14. The agricultural implement of claim 10, wherein the agricultural implement comprises an agricultural sprayer, and wherein the solenoid or the valve is located on the agricultural sprayer.

15. The agricultural implement of claim 10, wherein the jumper harness is configured to be utilized during field operations of the agricultural implement.

16. The agricultural implement of claim 10, wherein the jumper harness is configured to be utilized during performance of diagnostics on the agricultural implement.

17. The agricultural implement of claim 10, wherein the jumper harness is configured for utilization with a 12 volt operating system.

18. The agricultural implement harness of claim 10, wherein
    the jumper harness comprises a plurality of the LEDs.

19. A method for performing diagnostics on a work vehicle or an agricultural implement, comprising:
    coupling a jumper harness to a wiring harness of an electrical circuit coupled to a solenoid or a valve of the work vehicle or the agricultural implement, wherein the jumper harness comprises a plurality of electrical conductors and a light emitting diode (LED) coupled to the electrical conductors, and wherein an entirety of the jumper harness is disposed on the agricultural implement when coupled to the wiring harness on the agricultural implement;
    providing electric power to the electrical circuit;
    emitting light when receiving electric power that is provided to the solenoid or the valve; and
    failing to emit light when electric power is not provided to the solenoid or valve.

* * * * *